April 13, 1965 R. G. HOLMAN 3,177,918
METHOD OF BUILDING A TREAD ON PNEUMATIC TIRES
Filed Dec. 24, 1959 8 Sheets-Sheet 2
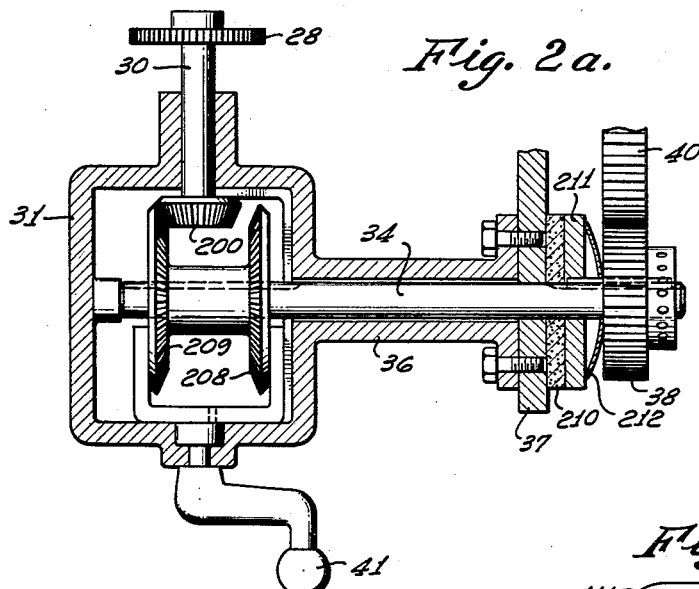
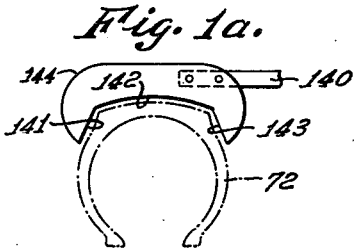
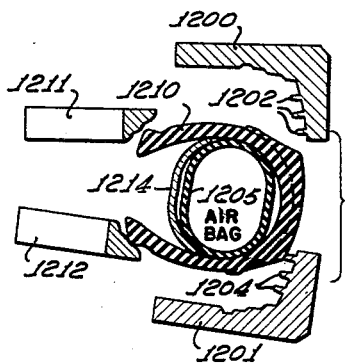
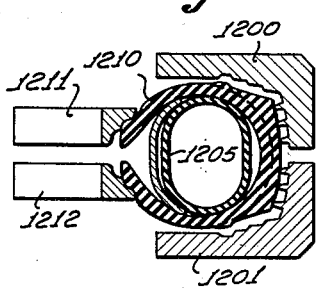
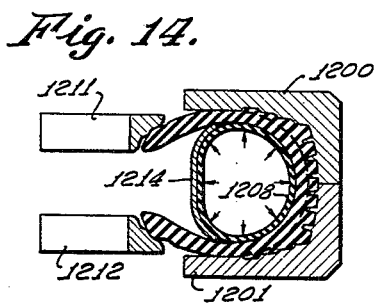
INVENTOR.
RUDOLPH G. HOLMAN
BY
Nicholas T Volk
ATTORNEY.

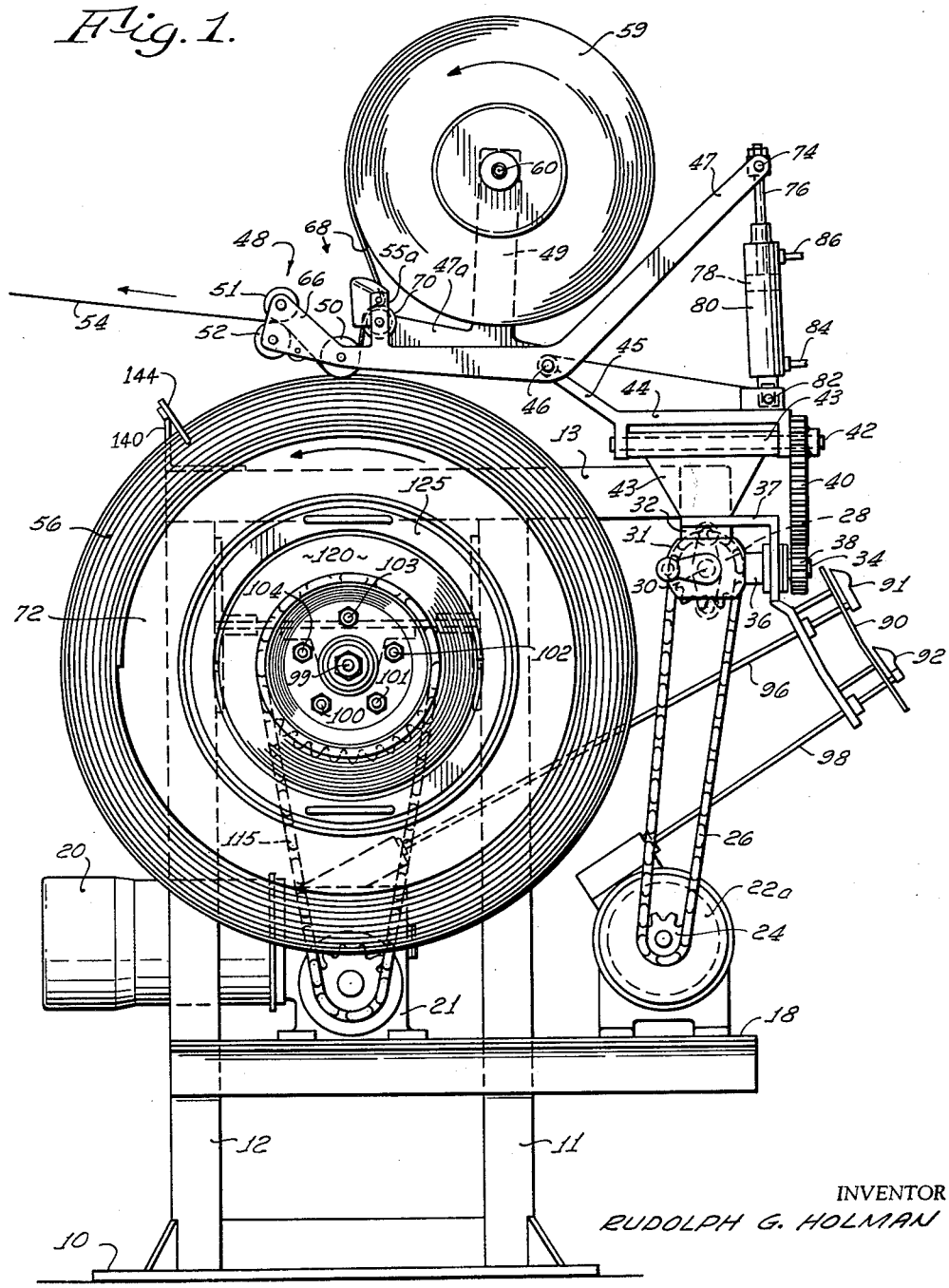

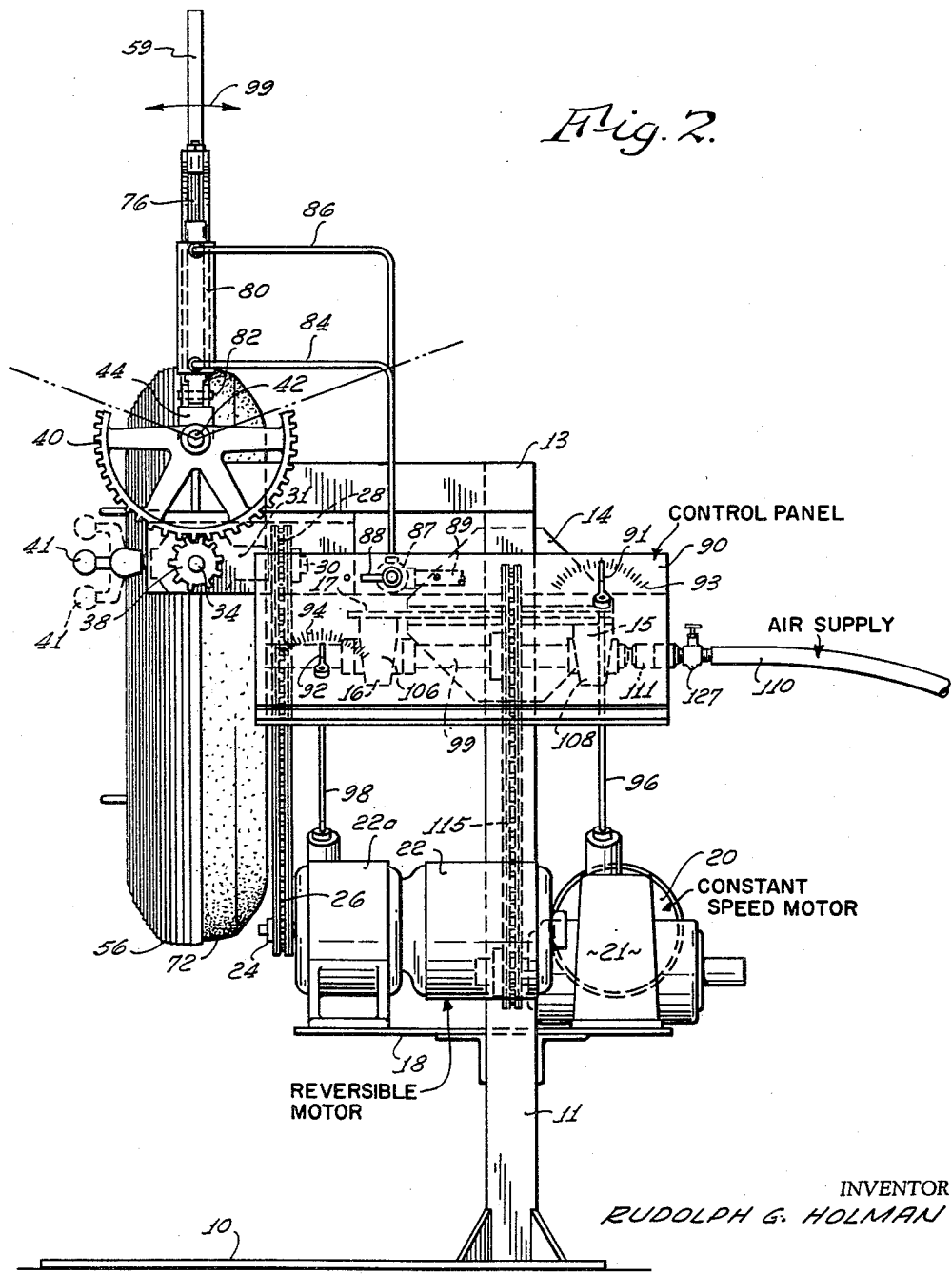

April 13, 1965 R. G. HOLMAN 3,177,918
METHOD OF BUILDING A TREAD ON PNEUMATIC TIRES
Filed Dec. 24, 1959 8 Sheets-Sheet 4

INVENTOR
RUDOLPH G. HOLMAN
BY Nicholas T Volm
ATTORNEY

April 13, 1965  R. G. HOLMAN  3,177,918
METHOD OF BUILDING A TREAD ON PNEUMATIC TIRES
Filed Dec. 24, 1959  8 Sheets-Sheet 5
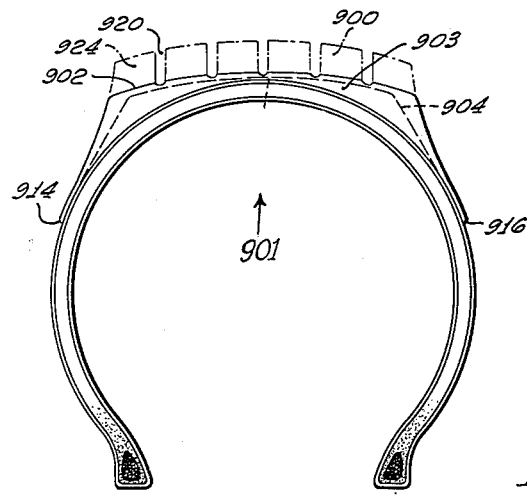
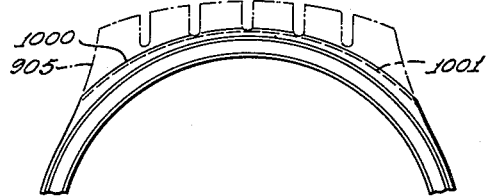
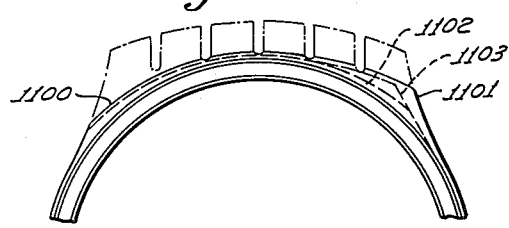
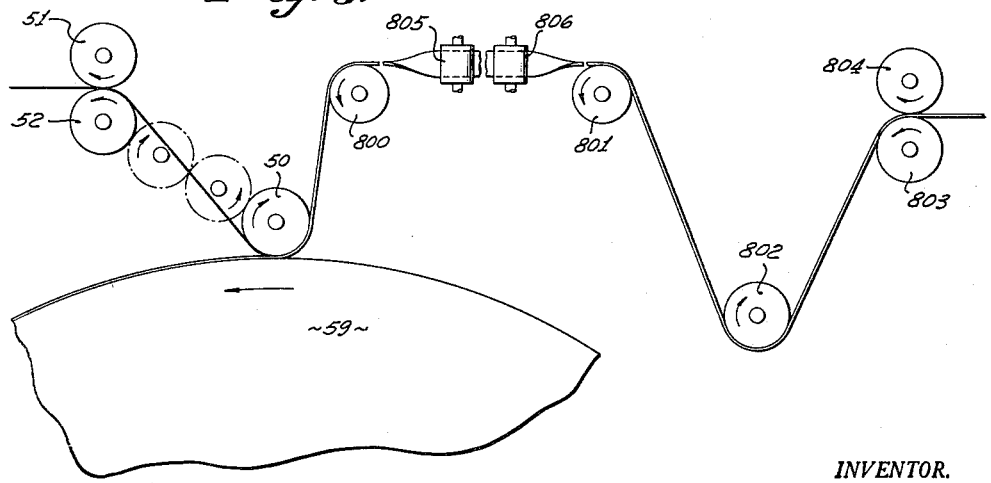
INVENTOR.
RUDOLPH G. HOLMAN
BY
Nicholas T Vohr
ATTORNEY.

April 13, 1965 R. G. HOLMAN 3,177,918
METHOD OF BUILDING A TREAD ON PNEUMATIC TIRES
Filed Dec. 24, 1959 8 Sheets-Sheet 6
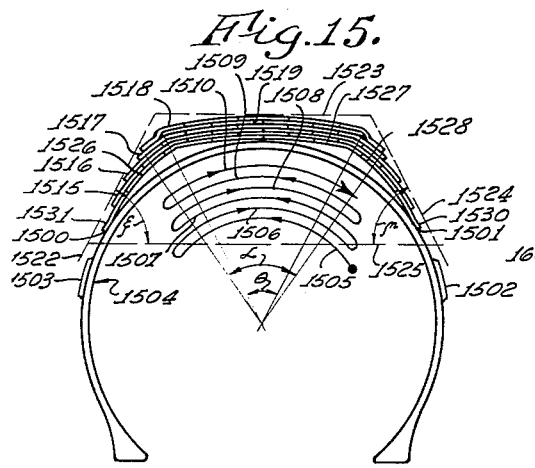
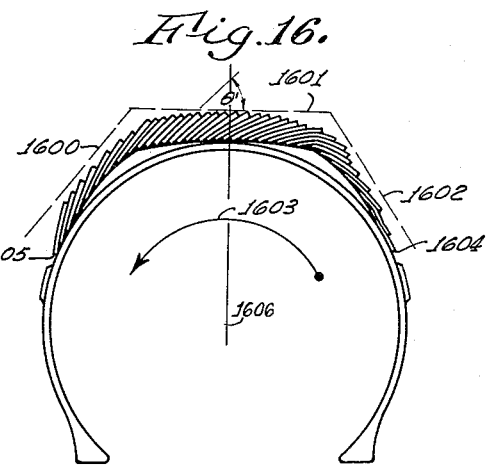
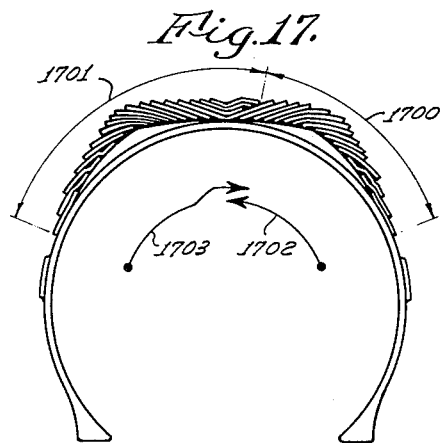
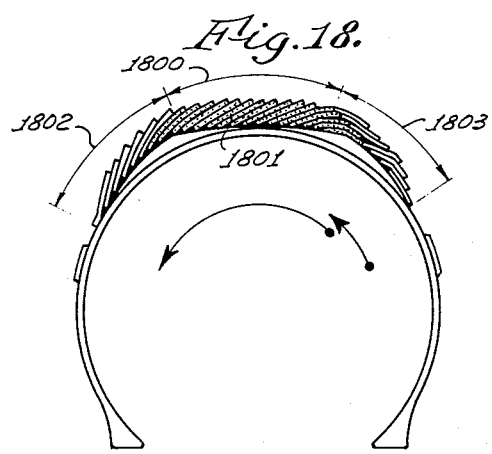
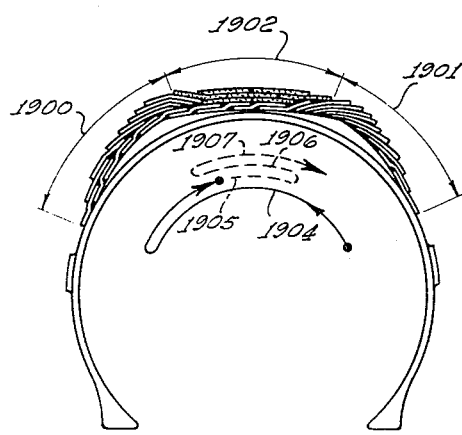
INVENTOR
RUDOLPH G. HOLMAN
BY
Nicholas T Volk
ATTORNEY

INVENTOR
RUDOLPH G. HOLMAN

BY

ATTORNEY

April 13, 1965    R. G. HOLMAN    3,177,918
METHOD OF BUILDING A TREAD ON PNEUMATIC TIRES
Filed Dec. 24, 1959    8 Sheets-Sheet 8
Fig. 23.
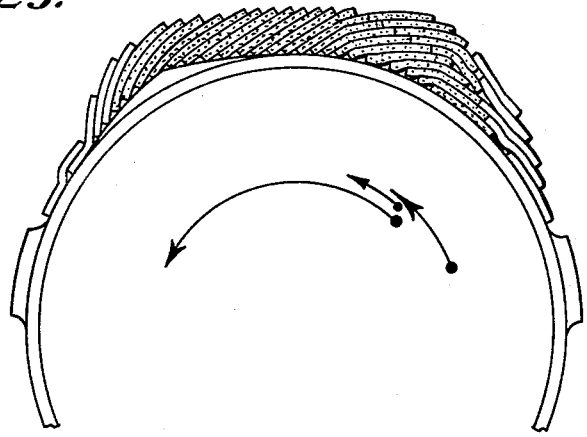
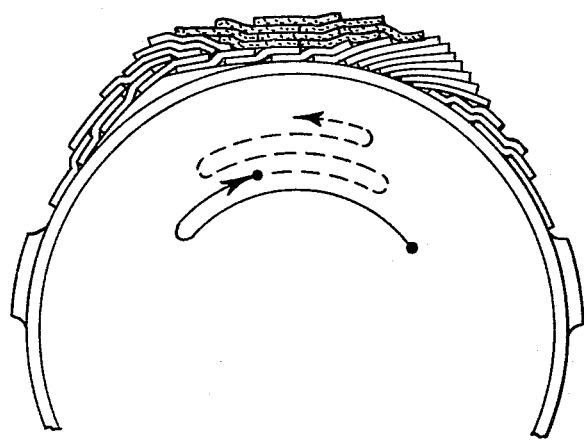
Fig. 24.
INVENTOR
RUDOLPH G. HOLMAN
BY
ATTORNEY , # United States Patent Office

3,177,918
Patented Apr. 13, 1965

3,177,918
METHOD OF BUILDING A TREAD ON PNEUMATIC TIRES
Rudolph G. Holman, La Habra, Calif., assignor to W. J. Voit Rubber Corp., a corporation of California
Filed Dec. 24, 1959, Ser. No. 861,960
15 Claims. (Cl. 152—330)

This invention relates to methods for applying a ribbon of pliable elastomeric material, such as either natural or synthetic rubber, a combination of the two, synthetic resin or rubber-like or resin-like materials, to a vehicular tire in the course of its original manufacture or for retreading used tires.

By way of example, the invention will be described in connection with tire retreading.

Pneumatic tires are now retreaded, or recapped, by first buffing the tire on a buffer and then applying a band of proper shape of unvulcanized rubber stock, known as "camelback," to the buffer surface. The word "camelback" was applied to an extruded ribbon of uncured rubber having one flat surface, and, in some types, two humped prominences on the opposite side, resembling the two humps of a camel, which explains the origin of the name of this product. The cross-section of such material is controlled by the shape of the opening in the extrusion die.

The "camelback" is "stitched," i.e., initially adhered, to the buffed surface through the natural stickiness of its undersurface, and then vulcanized in a mold, also of proper size, the mold being provided with a removable matrix. The matrix has a tread pattern which imprints this tread pattern to the camelback in the course of the vulcanizing step of the process. The camelback is furnished by a manufacturer who extrudes the uncured rubber through a die, thus imparting to the extruded ribbon-like slab a fixed shape which corresponds to the size of the tire and the size and shape of the mold's matrices that are used in the recapping operation of the tires of various sizes. Since camelback is preformed by extruding rubber stock through a die, it must be made up in various widths, thicknesses and shapes (various cross-sectional dimensions) in order to conform to the requirements of tires of different sizes and types, and the type of buffing performed on the tire prior to the actual recapping operation. As there is a large number of tire sizes, a large number of different sizes of camelback are manufactured to meet the requirements of the trade.

The recapping shops usually conduct their business at the present time as follows: The recapper decides on the type of tires that he wishes to recap, such as passenger car tires, sports car tires, truck tires, grader tires, heavy earth-moving equipment tires, landing gear aircraft tires, etc. Molds of the proper size are then bought and for each mold a number of matrices are bought. The matrices provide a variation in the outside diameter and cross-sectional width of the tire that can be fitted into the mold. Whenever the recapper recaps the tires, he must take into consideration the outside diameter of the buffed tire and its cross-section and then select a proper matrix which would enable him to recap this tire in such a manner that, after the camelback has been stitched onto the buffed tire, inserted into the matrix and then expanded by applying an air pressure, then the camelback will completely fill the entire gap between the matrix and the buffed tire. It is a matter of utmost importance that the camelback completely fills this gap, without leaving any voids either between the matrix and the camelback or between the camelback and the outer surface of the tire. It will be obvious that any such voids deleteriously affect the quality of the finished tire.

The recapper must thus have a variety of camelback stock of different shapes and sizes so as to match the variations in sizes of tires. The variations in the tire dimensions also arise due to lack of control of such dimensions in the course of manufacture, "growth" of the tire during use, and uneven wear caused by misalignment of the wheels, improper inflation, etc. From the above, it follows that proper buffing of the tires for obtaining a proper surface and also for obtaining the proper size, or the proper outside diameter of the tire, and the proper contour of the buffed surface, plays an important part for obtaining proper recapping of the tire. Buffing is also necessary in order to remove the oxidized layer of rubber which is not suitable for establishing proper mechanical bond with the new layer of vulcanized rubber. Only when all of the above factors are controlled, is it possible to obtain proper tread pattern, proper depth of the tread, proper filling of the space between the buffed surface and the matrix and establishment of proper bond in the course of subsequent vulcanizing of camelback to the buffed surface.

The capital investment in the large stocks of camelback can be very substantial. Further, the shelf life of uncured rubber is limited.

According to the invention, a relatively thin ribbon of elastomeric material, such as natural or synthetic rubber, or a combination of both, or synthetic resin, or rubber-like or resin-like material which may be mounted on an appropriate backing, or having no backing, is wound at a predetermined and controllable rate, preferably in a "relaxed" condition, on the previously properly buffed, inflated carcass in accordance with a predetermined winding pattern. The free end of the ribbon is secured in a suitable manner, as by pressure, to a predetermined point on the carcass, and the winding is continued until the proper amount of uncured rubber in terms of thickness and the shape and pattern of the applied layer, which is indicated by an appropriate reference matrix provided on the winding machine, has been wound on top of the buffed surface of the tire. Thus the tire being retreaded can be built up to any desired extent to fill properly and completely the space between the inner surface of the matrix and the outer buffed surface of the carcass. Thus, there is produced a tread of proper depth and proper filling of the space between the matrix and the carcass produces proper molding and adhesion of the cured retread to the carcass after the carcass is expanded by inflating to a suitable pressure and then cured in the mold.

The disclosed method of retreading does not eliminate the necessity of having the usual number of molds and matrices insertable into the molds, but it does eliminate the necessity of having a large inventory of various die sizes of camelback. According to the disclosed method, a single size ribbon of uncured rubber, or resin, either mounted on a proper backing, or having no backing, satisfies all the usual requirements of the retreading industry with the concomitant simple solution of the problem now faced by the manufacturer, of new tires, and, the retreader. There are some special situations, however, where the ribbon stock will have different dimensions (widths and thickness) for highly specialized tires that are used, for example, by the retreading earth-moving industry, but for every day use in an average retreading shop, a single size ribbon should be sufficient for satisfying all the requirements of such a shop. Shops of this type do not have molds for highly specialized tires anyway and, therefore, a single size ribbon stock would usually suffice.

An additional difficulty that is inherent in the present recapping and retreading methods resides in the fact that it frequently produces unbalanced treads because of either uneven stretching and straining of camelback during the stitching operation or "bunching" of the camelback at the splice. At the splice, the two ends are joined together as a butt or as a scarfed joint. In order to insure an adequate splice, the trailing end of the camelback through human error is made longer than it is called for by the geometry of the joint with the concomitant bulging of the material at the joint which is later flattened out by the stitching roller or rollers. Such use of excess material at the joint inherently produces unbalance in the end product. There are also difficulties encountered with the joint itself in its formation, which are also inherent in the method unless proper precautions and techniques are used for insuring the eventual formation of a perfect joint. The reasons for these difficulties need not be discussed here since they are known to the art. No such joint difficulties are present in the disclosed method because the splice in this case is altogether insignificant.

It is, therefore, an object of this invention to provide a method for producing a tread on pneumatic tire carcass by selectively applying a pliable ribbon in a completely relaxed state which is narrower than the transverse dimension of the tread by selectively, or controllably, in accordance with a predetermined pattern, applying to the outer periphery of the properly shaped and dimensioned, buffed or new surface of the carcass, ready for receiving the winding while the carcass is being rotated, simultaneously stitching the ribbon to the carcass, and continuing the winding operation until the desired outer contour of the layer of new rubber is obtained upon the completion of the winding, whereupon the applied winding is ready for curing in a mold for transforming the stitched ribbon into a tread vulcanized to the carcass.

An additional object of this invention is to provide a method of the above type in which the selective application of the ribbon stock to the outer periphery of the carcass is controlled so as to produce the desired final contour which would conform to the dimensional or volumetric requirements of the matrix.

Still another object of this invention is to provide a plurality of patterns for applying the ribbon stock for obtaining the desired thickness of uncured rubber and proper outer contour of the winding produced in a symmetric or asymmetric carcass.

It is an additional object of this invention to provide a plurality of patterns for applying several types of the ribbon stock to the retread receiving portion of an outer surface of a tire, including the pattern for producing a snow tread on the tire.

The novel features which are believed to be characteristic of this invention, both as to its organization and methods of operation, together with further objects and advantages thereof, will be better understood from the accompanying drawings in which several embodiments of the invention are illustrated by way of several examples. It is to be understood, however, that the drawings are for the purpose of illustration only and are not intended as a definition of the limits of the invention.

Referring to the drawings:

FIG. 1 is a side view of the tread-winding machine;

FIG. 1a is a side-view of a matrix and a sectional view of a tire with the proper amount of ribbon wound on the carcass;

FIG. 2 is a front view of the machine;

FIG. 2a is a plan view, partially in sections, of a bevel gear cluster used in the winding machine;

FIG. 8 is a side view of another version of the stitching apparatus;

FIGS. 9–11 are transverse sections of used tires with the respective buffing lines being also indicated in these figures;

FIGS. 12–14 are transverse sections of a mold matrix and of a tire within the matrix;

FIGS. 15–24 are a series of diagrammatic sectional representations of various patterns for applying the tape to the carcass of the tire.

Figure 3:
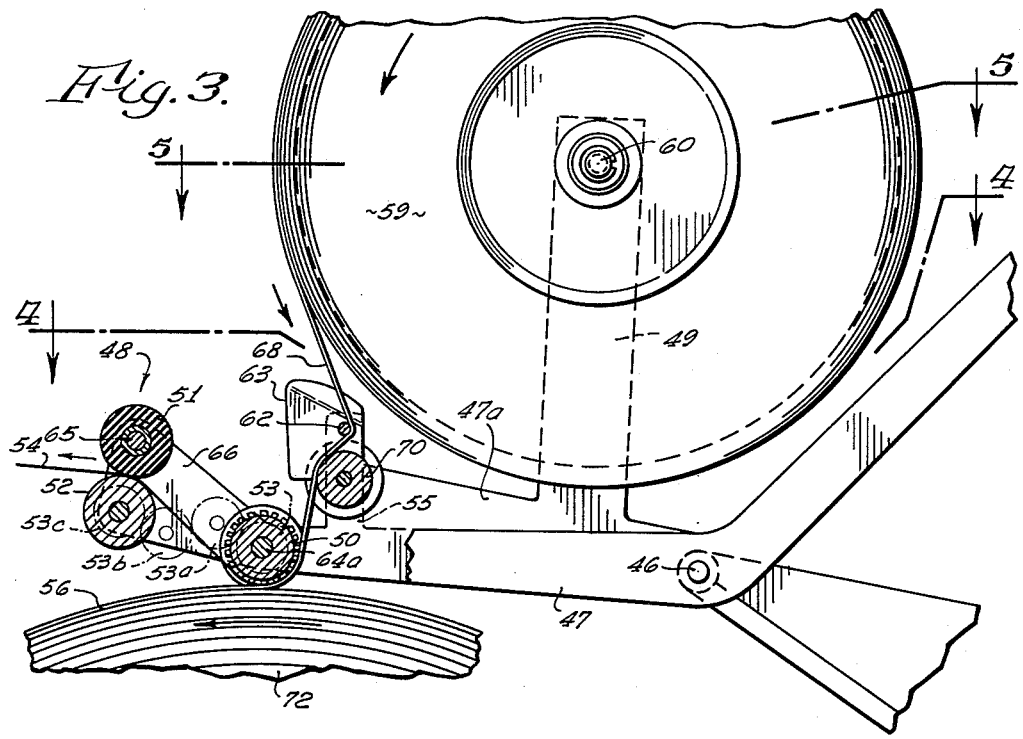
FIG. 3 is an enlarged side view of the ribbon guiding and stitching mechanism.
Figure 4:
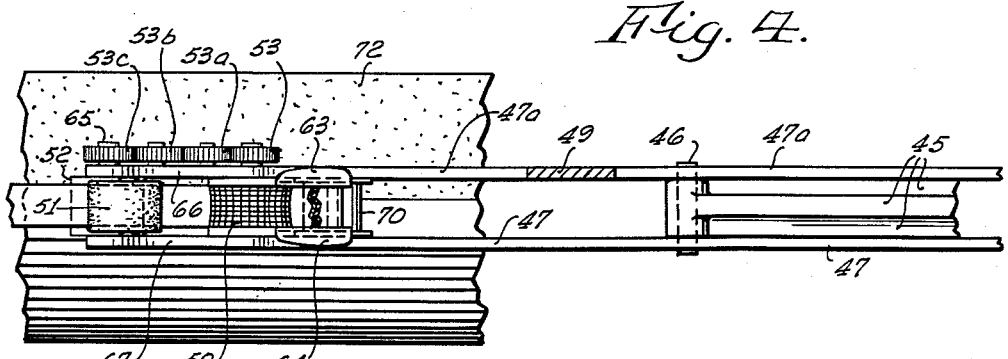
FIG. 4 is a plan view of FIG. 3 taken along line 4—4 illustrated in FIG. 3.

Since the invention is disclosed by way of an example, in connection with recapping of used tires, before proceeding with the description of the machine and the actual method of applying the winding to the tire, it will be helpful to illustrate several shapes of the used tires that occur in actual practicing of the recapping and also to illustrate the buffing techniques that are applicable to the used tires. The above is illustrated in FIGS. 9–11.

Referring to FIG. 9, it illustrates the transverse section of a typical tire which originally had tread the extent of which is shown by line 900 constituting an integral part of a tire 901. Line 902 illustrates the outer surface of the tire after it was in use and was brought in for recapping. In this case, the wear of the tire was quite even across the tread of the tire and the tire was used only up to that point when the root of the tread still remains slightly visible along the outer periphery of the tire, with the result that the under-tread layer 903 remains intact. Under such circumstances, it is best to buff the tire in the manner indicated by line 904 and therefore, the completed new winding, produced by the winding of the ribbon, must restore in proper manner that volume and shape of new rubber which is defined by the line 900.

FIG. 10 illustrates more severe wear conditions. The outer periphery of this tire is illustrated by line 1000, which indicates that, in this case, the tire shoulders were also subjected to very severe wear, with the result that it becomes necessary to have substantially circular buffing indicated by line 1001. Under such conditions, the winding should have a transverse section which is defined by the buffed line 1001 and the original tread, as shown by line 905.

FIG. 11 illustrates still another type of wear which is encountered when the tire is mounted on the front misaligned wheels or when some other improper mechanical conditions arise which produce an asymmetric wear of the tire. In this case, the left shoulder 1100 has been worn off while the right shoulder 1101 still remains on the tire. In the prior art, it has been customary to buff such tires in a manner indicated by a dotted line 1102, which has an approximately circular locus, identical to that illustrated in FIG. 10. The same type of buffing, i.e., that illustrated by line 1102, can also be used in the disclosed method. The advantage of such symmetrical buffing across the entire face of the tire resides in the fact that it becomes much simpler to program the application of the ribbon to the outer surface of the tire because of the symmetry of the resulting winding. However, the disclosed method is sufficiently flexible so as to enable one to buff the tire in the manner indicated by line 1103, which is asymmetric. It thus becomes possible to save the original rubber at the right corner 1101.

FIGS. 12, 13 and 14 illustrate the known method of inserting the tire into a mold matrix to which a proper camelback has been applied either according to the old known methods of retreading or in accordance with the method disclosed here, in which case the camelback is replaced with the ribbon. FIGS. 12, 13 and 14 are self-explanatory and need no detailed discussion. They are used here for the sole purpose of demonstrating and illustrating the fact that it is equally important in the old method, as well as in the new method, to have a tire and camelback, or the tire and the winding, of such dimensions, and the camelback or the winding of such thickness, so as to produce the tread or proper thickness and with sufficient under-tread layer, 903 which extends completely across the entire transverse section from point 914 to point 916 on the retreaded tire, points 914 and 916 illustrating the circular boundaries between the new rubber and the old rubber still remaining on the tire that is being retreaded. This under-tread layer is essential for producing proper adhesion for anchoring of the finished, fully vulcanized tread to the carcass. If this under-tread layer is not present, and the inner tread grooves 920, etc. are allowed to project all the way to the buffed surface 904, then the individual tread blocks, such as blocks 924, will not adhere in proper manner to the buffed surface 904 of the tire. The boundary lines between the buffed under-tread layer 903 and the individual blocks 924 provide the tear points along which separation of the tread might eventually occur.

FIG. 12 illustrates the cross-sectional view of the matrix having the upper portion 1200 and the lower portion 1201 which are two circular rings having transverse sections of the type illustrated in FIG. 12. Both rings are being provided with tread pattern projections 1202 and 1204 which produce the pattern on the tread in the manner illustrated in FIG. 14 when an air bag 1205 is inflated in the manner illustrated in FIG. 14. FIG. 12 illustrates that position of the tire and the two matrices which occurs when tire 1210 is being inserted into the matrix and then the matrix is closed upon itself in a manner illustrated in FIGS. 13 and 14.

FIGS. 12-14 also illustrate bead aligners 1211 and 1212 which automatically and properly center the tire within the matrix when it is being closed. Some of the molding apparatus uses such centering rings and some of the molding apparatus dispenses with them altogether, in which case the centering of the tire within the matrix comes about automatically when the air bag is inflated and the tire seeks its own center by virtue of being encased by the matrix. FIGS. 12-14 also disclose the transverse section of a metallic curing rim 1214 which generally consists of a plurality of hinged segments for facilitating the insertion of the rim into the carcass and around the air bag.

Referring to FIGS. 1-6, which illustrate a preferred embodiment of the invention, the machine shown includes frame members 10-18. These frame members are used for supporting the various elements of the machine. The cross-member 18 supports a constant speed electric motor 20 and a gear box 21 used for driving, or rotating, a tire wheel 120 through a chain drive 115. Also mounted on the frame is a constant speed motor 22 provided with a variable speed drive 22a which is used for oscillating back and forth a sector gear 40 and the entire ribbon stitching apparatus, illustrated on an enlarged scale in FIG. 3. The oscillation of the stitching apparatus and of the ribbon roll 59 with its arms 47 and 47a, and of the stitching assembly 48, permits a controllable application of the ribbon stock to the outer adjacent surface of a tire carcass 72 so as to wind either one or a plurality of layers of ribbon 56 on the tread-receiving portion of the tire. Such selective and controllable applications of the ribbon produces the ribbon patterns illustrated in FIGS. 15-24 where the transverse sections of these patterns are illustrated. This ribbon-winding mechanism will be described first and it then will be followed with the description of the drive for tire 72 and tire wheel 120.

Proceeding now with the description of the drive and control means for the ribbon-winding and stitching assembly, motor 22 is provided with a sprocket and chain drive including sprocket 24, chain 26, and a sprocket 28 which is mounted on a shaft 30. Shaft 30 is supported by a gear box 31 and a frame bracket 32 connected to the frame member 13. Shaft 30 includes a reversible bevel gear drive mounted in gear box 31 (see FIG. 2a) the driving pinion 200 of the bevel gear being an integral part of shaft 30, while the reversing gear cluster is slidably keyed to and mounted on a shaft 34. Shaft 34 is rotatively mounted in a hub 36 which constitutes an integral part of box 31, box 31 being also supported by a frame bracket 37. Shaft 34 drives a pinion 38, keyed to shaft 34, and pinion 38 meshes with and drives, or oscillates, a sector gear 40 keyed to an axle 42. Therefore, axle 42 revolves, or oscillates, with gear 40. Axle 42 is rotatively mounted in a frame bracket and hub 43. Sector gear 40 is permanently, or non-rotatively, connected to a U-shaped bracket 44 which is rotatively mounted on axle 42. Therefore, the connections between the reversible motor drive 22 and the sector gear 40 is as follows: Reversible drive 22a, sprocket wheel 24, chain 26, sprocket wheel 31, shaft 30; the reversible bevel gear drive mounted in box 31 and hub 36, and reversible bevel gear cluster connected to shaft 34, pinion 38 and sector gear 40. This drive also includes a manually controlled handle 41 for connecting to and disconnecting from gear 200, the two bevel gears 208 and 209 of the cluster and for reversing the direction of rotation of shaft 34 or disconnecting shaft 34 from the gear drive and motor 22. The rotation reversing gear drive 200, 208, 209, 34 and 38 also includes a friction clutch including a friction disk 210. Friction disk 210 makes a frictional engagement with the frame member 37 on one side and with the clutch plate 211 on the other side. This friction clutch is used to hold the entire stitching assembly in proper angular position when it is placed into a slanting position by the sector gear 40. A gravitational pull on the stitching assembly otherwise would rotate the assembly until it would strike the frame. This will become more apparent after reading the description of the stitching assembly.

Proceeding now with the description of that part of the machine which supplies the ribbon stock from coil 59 and stitches this stock to the tire, this stitching apparatus is mounted on the axle 42 and is oscillated by the sector gear 40. Gear 40 is connected to a U-shaped bracket 44 mounted on axle 42. The U-shaped bracket 44 includes a pivot arm 45 having a drilled hole at its projecting end for mounting a pin 46. Pin 46 rotatively interconnects pivot arm 45 with two guide arms 47 and 47a. The guide arms 47 and 47a support a ribbon-stitching assembly 48 and a reel bracket 49, the latter being an integral part of the guide arm 47a. The ribbon stitching assembly includes a barrel-shaped stitching roller (see FIGS. 3 and 4) and two cover, or backing, rollers 51 and 52 which strip the backing ribbon 54 from the composite ribbon 68 after it has been stitched to the tire carcass.

Roller 52 is a rubber covered roller while roller 51 is a metallic roller, with roller 51 pressing on roller 52. In this manner roller 52 rotates roller 51 when roller 52 is driven by roller 50 through a gear train including gears 53, 53a, 53b and 53c. Rollers 51 and 52 are used for stripping and guiding backing ribbon 54 from the composite ribbon 68 which includes backing 54 and unvulcanized rubber ribbon 56, as described more in detail below.

The rubber ribbon 56, which is the tread material, as mentioned previously, may be either a natural rubber, a synthetic rubber, a combination of synthetic and natural rubber, or all synthetic rubbers and resins which are thermosetting and which can be processed to produce flexible sheets or strips of the type used in this method and machine. In the synthetic elastomer class, if viewed broadly, one may include a number of synthetic rubbers, silicone rubbers, acrylonitrile resin-rubber molding compounds, and polyolefine resins. At the present time the most suitable material for tread rubber is the so-called SBR synthetic rubber, which has good wearing qualities. Also gaining prominence is the butyl rubber. Depending upon the properties of the tread material, it may or may not have a tacky surface which would be capable of adhering to the carcass surface and, if the winding pattern so requires, to the ribbon itself. Natural rubber is capable of retaining tackiness for a considerable length of time because of naturally self-contained resinous and protein materials. Therefore, when the ribbon is made of material having inherently good and strong adhesive or adhering properties, it is necessary to use a backing made of polyethylene, canvas, paper, etc., polyethylene backing being especially suitable because of its cost and high tensile strength, even when the thickness of the tape is in the order of .002".

It is obvious that the most important requirement that must be satisfied in selecting the tread material is that it should have good wearing qualities. The two materials that satisfy this most important requirement to date, are the synthetic rubber known in trade as SBR (styrene butadiene rubber) and natural rubber. The SBR rubber is used on the passenger tires and natural rubber is used on truck and aircraft tires because of better ability of the natural rubber to dissipate heat and resist tearing under stress. There is also some use of butyl and neoprene rubber in the passenger tires. Natural rubber retains its tackiness for a considerable length of time and, therefore, the use of backing with natural rubber is indispensable when it is used in a roll form.

Most synthetic rubbers are normally non-tacky at ambient temperatures and therefore, it is possible to eliminate the use of backing altogether and thus reduce the cost of the materials necessary for building and treads. The methods for obtaining proper adherence of the non-tacky ribbon to the carcass are discussed at the end of this specification. The description given below is for the tacky ribbon requiring the use of the polyethylene backing and using either rubber or resin which has at least one tacky surface.

In the embodiment of the invention shown in FIGS. 1–5, ribbon 68 is mounted in a roll form 59 on a reel having a threaded end and a stud 61 attaching hub 60 to the reel supporting arm 49. Roll 59 is rotatively mounted on hollow hub 60a. Arms 47 and 47a are also provided with extension arms 55 and 55a (arm 55a is not visible in FIG. 3; is visible in FIG. 1) which support an idling roller 70, a guide pin 62 and two guide plates 63 and 64 (see FIG. 4), all of which guide ribbon 68 over roll 70 to the stitching barrel-shaped wheel, or roller, 50, rotatively mounted on a pin 64a which is mounted on the arms 47 and 47a.

Compression roller 51, preferably made of metal, is mounted rotatively on pin 65. Pin 65 is supported by two side-plates 66 and 67 which constitute the two extensions of the guide arms 47 and 47a. Roller 50 is geared to roller 52 through gears 53, 53a, 53b and 53c and is driven by roller 50. Compression roller 51 is driven because of its frictional engagement with the polyethylene backing ribbon 54, which is driven or pulled by roller 52, which forms a compressional engagement with roller 51 through the polyethylene backing film of ribbon 54. As mentioned before, rollers 51 and 52 are used for stripping backing 54 from ribbon 68 and for feeding the stripped backing to a suitable disposal receptacle (not shown). Therefore, the composite ribbon 68, having backing 54 and rubber ribbon 68, is unwound from roll 59 by means of a frictional engagement between the stitching roller 50 and the outer periphery of a tire 72 which is rotated by means of the tire-driving motor 20.

It is quite important to maintain a uniform pressure exerted by the stitching roller 50 on tire 72. To achieve this, the outer ends of the guide arms 47 and 47a are connected through studs 74 to a piston rod 76 which is connected to a piston 78 mounted in a swinging cylinder 80 connected to bracket 44 by means of a pin 82. Cylinder 80 is also connected to a source of fluid under pressure such as compressed air by means of hoses 84 and 86. Hoses 86 and 84 are connected to a manually operated valve 87 (see FIG. 2) having a handle 88. Valve 87 is a four-way valve which alternately supplies compressed air either to the upper or lower portion of cylinder 80 for moving assembly 48 into its operative position shown in FIGS. 1 and 3, and holding it there, and for returning it to its inoperative position (not shown) upon completion of the winding operation. Valve 87 is connected to hoses 84 and 86 and pipe 89 is connected to a pressure regulator (not shown) and a source of compressed air. Valve 87 is mounted on panel 90. Since cylinder 80 is connected to the source of compressed air through the pressure regulator, constant pressure is exerted by piston 78 on the stitching roller 50 and on ribbon 68 as it is being stitched to tire 72, irrespective of the angular positions of the guide arms 47 and 47a.

Besides valve 87 and its control handle 88, the control panel 90 also includes a manually operated speed control arm 92. Panel 90 is also provided with an angular scale 94 for indicating the angular position of arm 92. Arm 92 is connected to a control rod 98 which is used to control the speed of the angular travel of the stitching apparatus around its axis and shaft 42 by varying the speed of rotation of motor 22, which drives the sector gear 40 and, therefore, through this sector gear, rotates, or oscillates, the entire reel assembly in the manner indicated by an arrow 99 in FIG. 2. When gears 208 and 209, FIG. 2a, are disengaged, the entire stitching assembly is held in fixed position and is prevented from rotation by the drag clutch interposed between the frame member 37 and shaft 34. This clutch includes a friction disk 210, clutch plate 211 (FIG. 2a), which is keyed to shaft 34 but movable axially, and a Belleville spring 212, which pressurizes this assembly.

Referring now to motor 20 and its connections, this motor is used for driving the tire wheel 120. Wheel 120 is mounted on an axle 99 by means of five threaded studs 100–104 and hexagonal nuts illustrated in FIG. 1. Wheel 120 is a modified automobile wheel, having one of its flanges removable for quick mounting and demounting of tire 72. Axle 99 is mounted on two bearings 106 and 108 supported by the frame members. Axle 99 is a hollow axle and its outer end is connected to an air hose 110 which supplies compressed air to the wheel and then to tire 72 through the wheel rim for inflating the tire and for keeping it under constant, regulated pressure during the ribbon winding operation. A rotatable, air-tight joint 111 is inserted between the axle and the hose.

The machine is also provided with a referenced template 144 shown in FIGS. 1 and 1a which is mounted on frame of machine by means of bracket 140. Template 144 defines the contour of the tire after compression of the winding operation. This contour is illustrated by the inner three edges 141, 142 and 143 of the template. These three edges constitute reference lines for winding a sufficient amount of rubber so as to fill the gap between carcass surface and the three edges 141, 142 and 143, producing a layer of desired thickness.

The operation of the machine is as follows:

Depending upon the wear to which the tire has been subjected prior to its buffing, the tire is buffed on the buffer (not illustrated) either to the pattern or contour 904, 1001, or 1103 illustrated respectively in FIGS. 9, 10 and 11. These contours have been described previously and, therefore, need no additional description. Upon completion of the buffing operation, the tire is transferred to the winding machine by mounting it on wheel 120 and then locking it in place by means of removable flange 125, FIG. 1. The tire is then inflated by opening valve 127, FIG. 2, which connects the tire to hose 110 which, in turn, is connected to the source of compressed air. The pressure that is used for inflating tire 72 at this stage is sufficient for stabilizing the position of the carcass during the winding operation and for making the buffed surface sufficiently stable and rigid for obtaining proper stitching of ribbon 68, FIGS. 3 and 6, to the buffed surface.

After tire 72 has been mounted on wheel 120 and properly inflated, a coat of conventional rubber cement is applied to the buffed surface of the carcass to make it tacky, whereupon one may proceed with the winding operation. It is essential for proper practicing of the method that ribbon 68 is capable of retaining its position on carcass 82 immediately upon its being stitched to the buffed surface by roller 50. It is only under such conditions that it becomes possible to obtain and maintain the integrity of the winding patterns, which are illustrated in FIGS. 15-24.

Figures 6, 7:
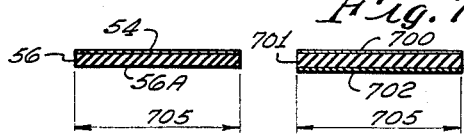
FIGS. 6 and 7 are enlarged transverse sections of the uncured rubber ribbon stock mounted on a backing.

Examination of FIGS. 6 and 7 reveals the fact that in FIG. 6 the ribbon includes backing 54 which may be polyethylene and the rubber portion 56 which has a rectangular cross-section. In this instance, the rubber portion 56 itself must have a sufficiently tacky surface 56a so as to produce proper stitching of this ribbon during the winding and stitching operation. One way to obtain such a tacky characteristic, is to compound the rubber ribbon 56 by using a mixture of synthetic and natural rubber. The synthetic rubber that has good wearing characteristics at the present time is the so-called SBR rubber.

The width 705 of the ribbon in FIGS. 7 and 6 is not critical although it obviously should be kept in mind that it should have some suitable finite dimensions so as to produce proper stitching and permit practicing the patterns illustrated in the FIGS. 15-24. Very good results and convenient practicing of the method have been obtained when the ribbon has a width range (dimension 705) from one-half inch to one and one-half inches, and preferably one inch wide and from one-sixteenth inch to one-eighth inch thick when such ribbon is used for retreading passenger car tires. The width and the thickness of the ribbon will be described still further in connection with the description of FIG. 16.

Before proceeding with the description of the above patterns, however, the description of the remaining steps of the method will be given here. After carcass 72 has been mounted on wheel 120 and properly inflated, roll 59 of the ribbon stock is mounted on reel 58-57 and it is then properly threaded through the rollers 70, 50, 51 and 52. Rollers 51 and 52 are used for separating the backing from the ribbon and, therefore, during this threading operation, the backing 54, FIG. 3, is separated from ribbon 56 and threaded through the rollers 51 and 52 while the leading end of the rubber ribbon 56 is tacked on to the buffed surface of the tire and more particularly to portions 1500 and 1501 of the tire which is slightly above the beauty rings 1502 and 1503. These portions 1500 and 1501 define the boundary circles or the circular junctions between the carcass 1504 and the new rubber that is wound on the carcass. After the lead end of the rubber ribbon is thus merely attached to the buffed edge 1501, FIG. 15, of the carcass 1504, one is ready to begin with the winding of the ribbon on the carcass in the manner indicated according to the patterns illustrated in FIGS. 15-24. Again, before describing these patterns, it may be stated in general that all of the above patterns are obtained by merely varying the angle of inclination of the ribbon with respect to the outer surface of the carcass and the rate of rotation of the tire stitching assembly around the axle 42 of this assembly. Motor 22 rotates wheel 120 and tire 72 at constant angular velocity and, therefore, at constant peripheral speed. Therefore, by varying the angular velocities, such as those illustrated by arrows and lines 1505-1510 in FIG. 15, it becomes possible to deposit either a greater or a smaller amount of rubber in any given transverse plane. It is also possible to deposit either a greater or smaller amount of rubber in any given transverse plane by maintaining a constant angular velocity of the stitching mechanism around axle 42 of this assembly and at the same time varying the speed of tire rotation. This can be done by having motor 22 rotate at a constant predetermined speed and varying the speed of motor 20.

Either drive arrangement would produce the desired end result. For the sake of clarity, the former arrangement, wherein the speed of motor 22 is varied and motor 20 is run at a constant predetermined speed, has been described in detail. If motor 20 is a variable speed motor, then its speed may be controlled by means of a control rod 96 and a manually operated lever arm 91 mounted adjacent to a scale 93 on panel 90.

In the example described below, the stitching assembly is rotated around axle 42 and this is accomplished by manually operating the speed control arm 92 which, in turn, varies the angular velocity of axle 42, sector gear 40, and of the tire stitching assembly. Accordingly, the angular velocity of ribbon 68 is also varied and when this velocity is equal to zero, then the applied ribbon pattern will comprise a circle positioned in one transverse plane with the layers of rubber being deposited on top of each other in one single transverse plane. When the angular velocity of the stitching assembly and of composite ribbon 68 is a uniform angular velocity, and is so adjusted as to produce a tight helical spiral of the type illustrated in FIG. 15, then all that will be necessary for producing the pattern of the type illustrated in FIG. 15 is periodically to reverse this motion of the stitching assembly in a manner illustrated by the path 1505-1510, such reversals taking place at progressively shorter periods of time so as to produce progressively narrower layers of rubber 1515-1518.

It will be seen, therefore, that the winding pattern illustrated in FIG. 15 represents a series of superimposed, helical spirals which, in the transverse plane, span progressively decreasing angles, or sectors, so as to produce the symmetrical crown, or tread outline, roughly defined by lines 1522-1524 which, together with line 1525, define generally a symmetrical trapezoid with line 1525 being parallel to line 1523 and angle $\xi$ being equal to angle $\nu$.

Figure 20:
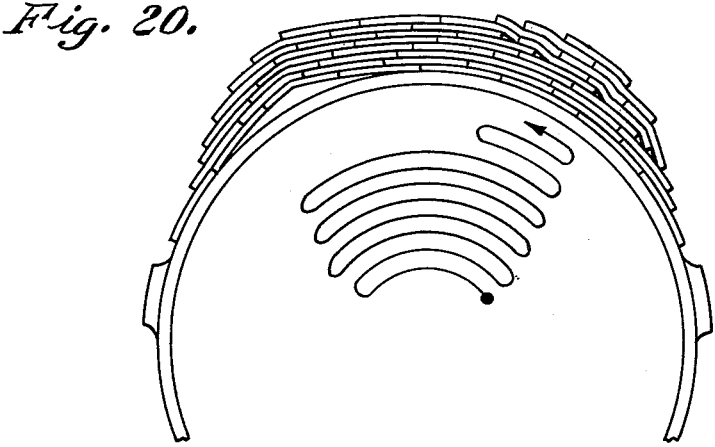

In FIG. 15, the original wear of the tire has been such that it was possible to buff this tire so as to follow a symmetrical pattern defined by the lines 1522-1524 of the previously mentioned parallelogram, the buffed surface being defined by the surfaces 1526-1528. In FIG. 20, however, an example is illustrated in which one corner or one edge of the tire was unevenly worn out and FIG. 20 illustrates the type of pattern that is capable of producing the final symmetric parallelogram defined by the same lines 1522-1524 by merely applying a larger number of turns or a larger number of layers of the ribbon to the asymmetrical portion of the carcass. This is accomplished by manually varying the angular velocities such as those which produce the paths of tire oscillation illustrated at 1505-1510 in FIG. 15. It may be remembered that the variation of the angle of velocity is obtained by merely varying the position of the speed control arm 92, while the reversal of the direction of the angular velocity is obtained by the operation of the manually operated reversing handle 41. In order to make the junction point 1500 a true circle, which is desirable in order to have a constant spacing between the newly applied retread and the beauty ring 1503 on one side, and equal and constant spacing between the beauty ring 1502 and the junction circle 1501 on the opposite side of the same tire, it becomes necessary to have angular speeds equal to zero at the time ribbons 1530 and 1531 are applied to the carcass.

The winding and the pattern illustrated in FIGS. 15-20 is completed after the last turn of the helical spiral is obtained in the upper layer 1518 of the winding. At this point, the rotation of wheel 120 is stopped which stops the entire operation of the machine and also stops the operation of the stitch mechanism since the latter is operated through the frictional engagement between the outer periphery of the carcass and the stitching roller 50 of this mechanism. At this stage, the entire stitching mechanism is swung away from the tire by operating the air valve handle 88, whereupon the trailing end of the ribbon, which has been last stitched to the winding, is manually cut off. This completes the winding operation. There now only remains to remove carcass 72 with the newly applied winding from wheel 120 and place it into the mold and the matrix of the mold in a manner illustrated in FIGS. 12–14 and cured in conventional manner.

It now only remains to describe the remaining patterns of the types of windings illustrated in FIGS. 16–24. Their nature should be apparent to the reader from the prior description of the method, and therefore, only a brief additional description should suffice.

In FIG. 16, the proper trapezoidal locus 1601–1602 is obtained by varying the angular velocity of the stitching apparatus as it travels along path 1603. One progresses with the winding from point 1604 to point 1605. When the velocity is reduced, then the angle subtended by the flat face of the ribbon and the surface of the tire, such as angle $\theta'$, becomes either larger or smaller depending upon the magnitude of the angular velocity 1603, this angle being larger when this angular velocity is reduced and being smaller when this angular velocity is increased. In this manner, it becomes possible to obtain the spiral pattern illustrated in FIG. 16 merely by varying the angular velocity, the angle of inclination of the ribbon with respect to the buffed surface and the degree of overlap between each preceding and succeding turn. Thus, in FIG. 16, no reversal of the directions of travel is necessary, which was the case in FIG. 15. Comparison of the pattern illustrated in FIG. 16 with that illustrated in FIG. 20 indicates that this type of winding and pattern is more flexible, control-wise, than that illustrated in FIG. 15 and from the point of view of obtaining the various outlines of the winding without the reversal of directions of travel. Therefore, patterns can be programmed either manually or automatically more readily and with a greater ease than the one illustrated in FIG. 15.

The dimensions of the ribbon for practicing the method illustrated in FIG. 16 follows from an examination of the pattern itself and of FIGS. 6 and 7. As seen in the latter figures, the width of the ribbon is greater than the maximum thickness of the desired tread so that the ribbon, while placed at an angle to the surface of the carcass, will comprise a complete layer of tread material. The natural following of the ribbon as wound forms a spiral about the carcass with the superimposition of the succeeding layer of ribbon over the preceding turn. Anchoring and adhesion of the flat surface of the ribbon is accomplished conveniently both to the preceding turn and to the surface of the carcass by the stitching mechanism previously described. As stated previously, in connection with FIGS. 6 and 7, the width of the ribbon is also greater than its own thickness.

Figure 21:
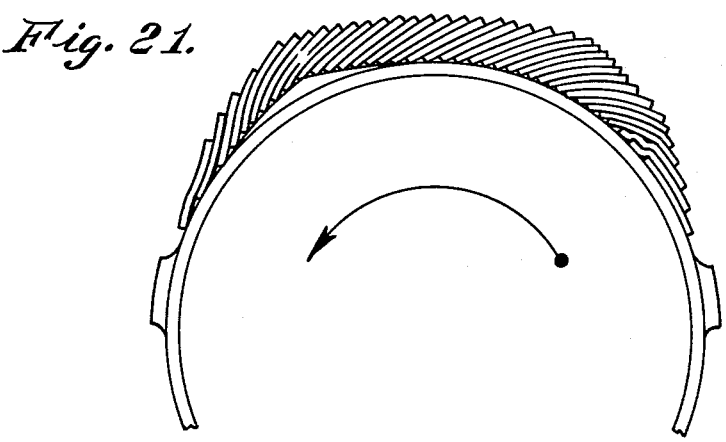

FIG. 21 illustrates the application of this type of winding and pattern to the asymmetrically buffed tire. One can very readily see that an asymmetric winding can be very readily obtained by means of such pattern by merely varying the magnitude of angle $\theta'$ illustrated in FIG. 16.

FIGS. 18 and 23 represent slight modifications of the techniques illustrated in FIGS. 16 and 21. The modifications reside in that sector 1800 in FIG. 18 includes the winding having a skid-proof winter tread rubber 1801 while the remaining sectors 1802 and 1803 represent application of the conventional ribbon rubber. The so-called non-skid treads use rubber with foreign particles uniformly dispersed within rubber. The particles may be wood chips, walnut shells, silica, cork; granules, etc., which are known to the tire art. In order to obtain the pattern illustrated in FIGS. 18 and 23, sector 1800 is applied first; sector 1802 is applied second; and sector 1803 is applied third in the manner described previously.

Figure 22:
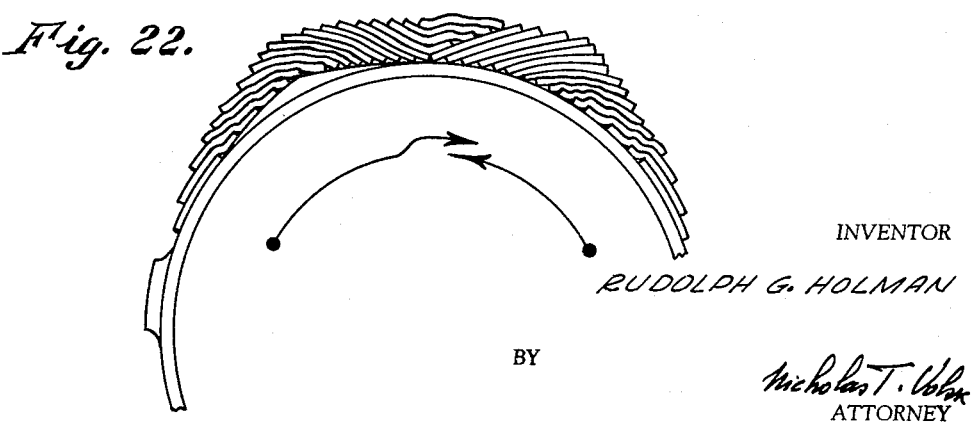

FIGS. 17 and 22 constitute another modification of the pattern and the method disclosed in FIGS. 16 and 21. In this case, sector 1700 is applied first and sector 1701 is applied second in the manner illustrated diagrammatically by the path 1702 and 1703 traveled by the stitching apparatus. The left sector 1701 is slightly superimposed over the right sector 1700 at the mid-portion of the tire. The resulting pattern is self-explanatory in the light of the prior description of comparable patterns.

The pattern illustrated in FIGS. 19 and 24 enables one to apply the various types of rubber compositions to the various sectors of the winding. The two outer sectors 1900 and 1901, illustrated in FIG. 19, are again composed of a conventional rubber while the central sector 1902 may be composed of the skid-resistant rubber of the type described in connection with FIGS. 18 and 22. The skid-resisting portion 1903 of the winding is superimposed on top of the sectors 1900 and 1901. The winding pattern illustrated in FIGS. 19 and 24 can also be obtained by following the velocity pattern and the path, illustrated at 1904–1907. The velocity pattern 1904 produces that portion of the winding which is composed of the conventional rubber while the velocity pattern 1905 produces that remaining portion of the pattern which is composed of the central portion 1903 for which a skid-resistant rubber has been used in the illustrated example.

From the above description of the method and applications, it follows that a very rapid application of a variety of windings is possible, that either a symmetrical or asymmetric winding is obtainable, and that it is also possible to vary the over-all thickness of the winding at any given point of this winding as one travels along a transverse arc subtended by the winding in the transverse plane. Accordingly, the geometry of the winding can be varied at will, so to speak, along the "X" as well as the "Y" axes (thickness and width) and such variation of the dimensions of the winding can be obtained at any point along the "X" axis and at any point along the "Y" axis. Accordingly, it is possible to obtain any number of transverse patterns, shapes, and dimensions of the final winding with a ribbon which has only one width and one thickness. It thus becomes possible to obtain any variety of windings for different tire sizes. Accordingly, it also becomes possible to recap or retread a large variety of tires of different sizes and shapes from those used in sports cars to those used in heavy trucks, with a single size ribbon having fixed width and thickness, thus completely eliminating and solving the problem that is now present and besets the recappers who must carry a variety of shapes of camelback stocks which are required for recapping the various sizes of tires.

It should be mentioned here that when one considers the recapping of unusually large special type tires, such as those used with the earth-moving equipment and some of the especially large airplane landing gear tires, it becomes desirable to enlarge the width as well as the thickness of the ribbon for facilitating the completion of the winding cycle in a reasonably short period of time. Tires of this type require the application of several hundred pounds of uncured rubber per tire and it is obvious that, under such circumstances, it becomes desirable to enlarge the width and the thickness of the ribbon. This may be compared to recapping of conventional tires such as those used in passenger cars requiring an application of only approximately eight to ten pounds of uncured rubber per tire.

The disclosed method is attractive insofar as recapping of the heavy-duty tires is concerned because the present method of recapping such tires requires the use of a plurality of sectors of camelback, with the resulting plurality of joints, or seams, between the sectors which always multiplies the probability of final failure due to the improperly formed joints during curing, or creations of highly unbalanced conditions throughout the circumference of tires. Unbalanced conditions are not a matter of great importance insofar as off-the-road tires are concerned for vehicles moving only at a slow speed. In the airplane tire, however, and in the automotive tire, the unbalanced conditions are important because of high rotational speeds involved.

The method also enables one to obtain proper control of the outer dimensions of the windings and of the final combination of the deposited layer on the outer surface of a carcass so that the end product conforms to the inner dimensions of the matrix so as to produce complete filling of that space which normally exists between the carcass and the matrix during the curing operation, this space having been discussed previously in connection with FIGS. 12–14. As explained previously, the winding must have proper dimensions in order to produce a tread pattern of proper depth and also in order to produce sufficient under-tread layer for proper adhesion and retention of the cured winding on the carcass. The disclosed method solves this problem very effectively because it is inherent in the method to adjust the radial thickness of the winding in any desired manner to suit the individual circumstances encountered at the time of the recapping operation on an individual tire.

It will be obvious to those skilled in the art that the present invention and methods herein disclosed may be adapted for use in applying elastomeric material on various forms of tire carcasses. Differences in shape and size, as noted hereinbefore, present no difficulty to one familiar with the art and the present invention. The present invention may be therein widely used without substantial change.

Figure 5:
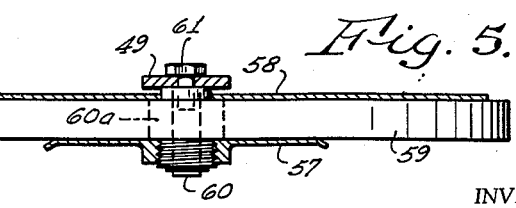
FIG. 5 is a sectional view of the ribbon roller, also illustrated in FIG. 3, the section being taken along line 5—5 shown in FIG. 3.

In FIGS. 1 and 2, the ribbon stock is mounted on a reel 58–57–60 (see FIGS. 3 and 5). Only a limited amount of rubber stock can be mounted on a reel of this type. In the modified form of the invention as shown in FIG. 8, the ribbon is fed from a suitable bulk source of supply (not shown) by feeding couple 800, 801, and thence over idler rollers 802, 803, 804, 805 and 806 to applying, i.e., stitching roller 50. The operation of the machine provided with this type of feed from bulk supply is substantially the same as that described hereinabove in connection with the machine shown in FIGS. 1–5. It will be understood that roller 50 and guide rollers 805, 806 are mounted in an applying device similar to assembly A described heretofore. An advantage gained by this modified form of the invention is that several tires can be prepared for the molds and vulcanization of the tread without need for replenishing the supply.

It has been mentioned previously that it also is possible to use the ribbon stock which has no backing when the material used for making the ribbon is non-tacky. There are several methods that can be used for attaching the non-tacky ribbon to the tire under such circumstances. They are as follows: The first method consists of heating the non-tacky ribbon just before stitching if the ribbon has such properties that it becomes tacky after being heated; for example, the synthetic SBR rubber can be made tacky upon heating. Heating of the rubber can be performed in several ways. In FIG. 1, rollers 70 and 50 can be heated to any desired temperature by means of induction heating and these rollers, in turn, then heat the ribbon. The same is also true of the rollers 801, 800, 802 and 50 in FIG. 8. Another method of heating the ribbon is to install the infrared source or sources of light in direct proximity of the ribbon between rollers 800 and 50 in FIG. 8, or rollers 70 and 50 in FIG. 1, with the infrared rays shining directly on that surface of the ribbon which is being stitched to the carcass. The second method consists of spraying rubber cement or resin glue, either on the surface of the carcass 90° or 180° or 320° away from the point of stitching on the ribbon itself, and if so necessary, heating or drying the sprayed cement or resin glue with the infrared rays for increasing its tackiness before the ribbon is stitched to the tacky surface.

What is claimed as new is:

1. A method of applying, to a tire carcass, a layer of tread material of variable thickness contour sufficient for forming the completed tread hereof, said carcass having peripheral tread areas and side wall areas to either side thereof, and a normal axis of rotation, which comprises the steps of:
   (a) supplying a continuous ribbon of tread material having a width greater than the maximum thickness of the tread to be applied, and
   at least several times its own thickness,
   (b) locating the forward end of said ribbon on said carcass adjacent one side wall area,
   (c) producing a relative rotation about said normal axis of rotation between said ribbon supply and said carcass to wind said ribbon around the periphery of said carcass,
   (d) producing a relative transverse motion between said ribbon supply and said carcass from said one side wall to the other to displace said ribbon across the periphery of said carcass by amounts less than the width of the ribbon for each rotation of said carcass
   to cause successive turns of said ribbon to partially overlap, and
   (e) varying the amount of said transverse motion in accordance with said desired contour
   to overlap the ribbon by greater amounts at the desired thicker portions and lesser amounts at the desired thinner portions to complete the desired contour across the carcass in a single traverse from side wall to side wall.

2. The method according to claim 1 including the step of selectively controlling the rate of movement of said carcass and said ribbon supply so as to vary the relative amount of the transverse movement.

3. The method according to claim 1 including the step in which in at least the thicker portions of the contour one edge of the ribbon is adhered to the carcass and its opposite edge is extended to the outer surface of the tread.

4. The method according to claim 1 including the step of adhering the ribbon both to said carcass and to the preceding turn of the ribbon.

5. The invention according to claim 4 including the steps of supplying the ribbon in tacky condition and pressing the overlapped portion of said tacky ribbon and the portion contacting the carcass with localized rolling pressure to stitch the same to the preceding turn of ribbon and to the carcass.

6. A method of applying, to a toroidal tire carcass, a layer of tread material of a desired thickness contour sufficient for forming the completed tread, said carcass having peripheral transversely curved crown and side wall areas to either side thereof, and a normal axis of rotation, which comprises the steps of
   (a) supplying a continuous ribbon of elastomeric material having a width greater than the maximum thickness of tread to be applied, and at least several times its own thickness,
   (b) locating the forward end of said ribbon on said carcass adjacent one side of said crown,
   (c) rotating said carcass about said normal axis of rotation to wind said ribbon around the periphery of said carcass,
   (d) producing a relative transverse swinging movement of said ribbon adjacent its point of application to said carcass about said transversely curved crown area
   to displace said ribbon across said crown from said one side to the other side by amounts less than the width of the ribbon for each rotation of said carcass
   to cause successive turns of said ribbon to partially overlap, and
   (e) varying said transverse swinging movement relative to the speed of rotation of said carcass in accordance with said desired contour
   to overlap the ribbon by greater amounts at the desired thicker portions and lesser amounts at the desired thinner portions to complete application of said tread material in a single traverse from side wall to side wall.

7. A method of applying, to a circular casing, a layer of elastomeric material of a variable thickness contour, said casing having a peripheral surface area and a normal axis of rotation, which comprises the steps of
   (a) supplying a continuous ribbon of elastomeric material having a width greater than the maximum thickness of the layer to be applied, and at least several times its own thickness,
   (b) attaching the forward end of said ribbon on the surface of said casing
   (c) rotating said casing about said normal axis of rotation to wind said ribbon around the periphery of said casing,
   (d) moving said casing and said ribbon relative to each other transversely across said peripheral areas in amounts less than the width of said ribbon for each revolution of said casing
   (e) applying said ribbon at an acute angle to the casing surface to cause successive turns to overlap with one edge of said ribbon contacting said casing surface and the other edge extending to the outer limit of said layer
   (f) varying the application of said ribbon across at least a part of said peripheral surface so as to vary the angle said ribbon makes with said casing surface in accordance with the desired contour by increasing the angle at the thicker portions and decreasing the angle at the thinner portions
   (g) stitching said ribbon both to said casing and to the preceding turn of said ribbon.

8. A method of applying, to a tire carcass, a layer of tread material of variable thickness contour sufficient for forming the completed tread thereof, said carcass having peripheral tread areas and side wall areas to either side thereof, and a normal axis of rotation, which comprises the steps of
   (a) supplying a continuous ribbon of tread material having a width greater than the maximum thickness of the tread to be applied, and at least several times its own thickness,
   (b) locating the forward end of said ribbon on said carcass adjacent said tread area at one side wall area,
   (c) rotating said carcass about said normal axis of rotation to wind said ribbon around the periphery of said tread area,
   (d) producing for each 360° revolution of said carcass a relative transverse movement between said ribbon supply and said carcass in one direction from said one sidewall to the other to displace said ribbon across said tread area by amounts less than the width of the ribbon for each revolution of said carcass to cause succeeding turns of said ribbon to partially overlap,
   (e) adhering said ribbon both to said carcass and to the preceding turn of said ribbon, and
   (f) varying the magnitude of said transverse movement for each revolution in accordance with said desired contour to overlap the ribbon by greater amounts at the desired thicker portions and lesser amounts at the desired thinner portions
   (g) to complete the desired contour across the carcass in a single traverse from side wall to side wall.

9. A method of applying, to a circular tread bearing member, a layer of elastomeric material of a variable thickness contour, said tread bearing member having a peripheral central area and side areas on either side thereof, and a normal axis of rotation, which comprises the steps of
   (a) supplying a continuous ribbon of elastomeric material having a width greater than the maximum thickness of the layer to be applied, and at least several times its own thickness,
   (b) attaching the forward end of said ribbon on said tread bearing member adjacent one side area,
   (c) rotating said casing about said normal axis of rotation to wind said ribbon around the periphery of said tread bearing member,
   (d) simultaneously moving said tread bearing member and said ribbon relative to each other transversely across said peripheral areas in amounts less than the width of said ribbon for each revolution of said tread bearing member
   (e) applying said ribbon at an acute angle to the tread bearing member surface to cause successive turns to overlap with one edge of said ribbon contacting said tread bearing member surface and the other edge extending to the outer limit of said layer
   (f) stitching said ribbon both to said tread bearing member and to the preceding turn of said ribbon and
   (g) completing the desired contour across the tread bearing member in a single traverse from side area to side area.

10. The method according to claim 9 including the step of varying the application of said ribbon so as to vary the angle said ribbon makes with said tread bearing member surface in accordance with the desired contour by increasing the angle at the thicker portions and decreasing the angle at the thinner portions.

11. The combination with a tire carcass, having a peripheral tread and sidewall areas, of a variable thickness contour layer of elastomeric tread material, said layer
   (a) being formed of a continuous ribbon of elastomeric material having a width several times its thickness and greater than the maximum thickness of the tread,
   (b) wound about the periphery of said carcass from one side wall to the other side wall, with succeeding turns of said ribbon partially overlapping preceding turns,
   (c) said overlapping being greater at the thicker portion of the tread and lesser at the thinner portion of the tread by amounts sufficient to provide the desired contour of said tread across said carcass.

12. The combination with a tire carcass, having a peripheral tread and side wall area, of a variable thickness contour layer of elastomeric material sufficient to form a completed tread therefor, said layer
   (a) being formed of a continuous ribbon of elastomeric material having a width several times its thickness and greater than the maximum thickness of the tread,
   (b) wound about the periphery of said carcass from one side wall to the other side wall, with succeeding turns of said ribbon overlapping preceding turns by an amount less than the width of said ribbon, and
   (c) with one edge of said ribbon contacting the surface of said carcass and the other edge extending to outer limit of said layer,
   (d) said overlapping being greater at the thicker portion of the tread and lesser at the thinner portion of the tread by amounts sufficient to provide the desired contour of said tread across said carcass in a single traverse of said ribbon.

13. The invention according to claim 12 in which the carcass and tread layer applied thereto is molded and cured to form a completed tire.

14. The invention according to claim 12 in which the turns of ribbon are adhered both to the carcass and to the preceding turns of ribbon.

15. The combination with a tire carcass, having a peripheral tread and side wall areas, of a variable thickness contour layer of elastomeric material sufficient to form a completed tread therefor, said layer (a) being formed of a continuous ribbon of elastomeric material having a width several times its thickness and greater than the maximum thickness of the tread,
(b) said ribbon being wound as a plurality of continuous turns around the periphery of said carcass at an angle with the surface of said carcass
(c) with one edge of said ribbon contacting the surface of said carcass and the other edge of said ribbon extending to the outer limit of said layer to overlap succeeding turns of said ribbon
(d) the angle of said ribbon varying in accordance with the contour of said tread by greater amounts at the thicker portions and lesser amounts at the thinner portions thereof, sufficient to provide the desired contour of said tread across said carcass in a single traverse of said ribbon.

References Cited by the Examiner

UNITED STATES PATENTS

| | | | |
|---|---|---|---|
| 951,872 | 3/10 | Wirt | 154—14 |
| 1,335,879 | 4/20 | Darrow | 156—405 |
| 2,121,252 | 6/38 | Marco | 154—9 |
| 2,411,659 | 11/46 | Manning | 156—29 |
| 2,729,269 | 1/56 | Antraignue | 154—9 |
| 2,760,550 | 8/56 | Kimes | 154—9 |
| 2,849,049 | 8/58 | Hanson | 154—14 |

FOREIGN PATENTS 896,013  11/53  Germany.

EARL M. BERGERT, *Primary Examiner.*

CARL F. KRAFFT, ALEXANDER WYMAN, *Examiners.*